(12) United States Patent
Theuwissen (10) Patent No.: US 9,071,748 B2
(45) Date of Patent: Jun. 30, 2015

(54) IMAGE SENSOR WITH FOCUS-DETECTION PIXELS, AND METHOD FOR READING FOCUS-INFORMATION

(71) Applicant: Albert Theuwissen, Bree (BE)

(72) Inventor: Albert Theuwissen, Bree (BE)

(73) Assignee: Harvest Imaging BVBA (BE)

( * ) Notice: Subject to any disclaimer, the term of this patent is extended or adjusted under 35 U.S.C. 154(b) by 152 days.

(21) Appl. No.: 13/849,625

(22) Filed: Mar. 25, 2013

(65) Prior Publication Data

US 2014/0285706 A1    Sep. 25, 2014

(30) Foreign Application Priority Data

Mar. 22, 2013    (EP) ..................... 13160673

(51) Int. Cl.
*H04N 5/369*    (2011.01)
*H04N 5/232*    (2006.01)

(52) U.S. Cl.
CPC .......... *H04N 5/23212* (2013.01); *H04N 5/3696* (2013.01)

(58) Field of Classification Search
None
See application file for complete search history.

(56) References Cited

U.S. PATENT DOCUMENTS

| 8,164,679 B2 | 4/2012 | Kusaka |
| 2007/0102619 A1 | 5/2007 | Kusaka |
| 2007/0154200 A1* | 7/2007 | Utagawa et al. ............. 396/111 |
| 2009/0128671 A1* | 5/2009 | Kusaka ......................... 348/246 |
| 2009/0278966 A1 | 11/2009 | Kusaka |
| 2010/0091161 A1* | 4/2010 | Suzuki ........................ 348/302 |
| 2011/0279727 A1* | 11/2011 | Kusaka ........................ 348/340 |
| 2012/0033128 A1 | 2/2012 | Nagano |
| 2012/0038810 A1* | 2/2012 | Taniguchi .................... 348/308 |
| 2012/0138773 A1* | 6/2012 | Taniguchi .................. 250/208.1 |
| 2012/0300102 A1* | 11/2012 | Tamura et al. ............... 348/294 |

FOREIGN PATENT DOCUMENTS

| EP | 2249192 | 11/2010 |
| EP | 2487897 | 8/2012 |
| JP | 2008-103885 A | 5/2008 |

OTHER PUBLICATIONS

Search Report in corresponding EP 13160673.3, Nov. 6, 2013.
Search Report in corresponding EP 13160709.5, Nov. 12, 2013.
Extended European Search Report in corresponding EP 1316073.3, Mar. 7, 2014.

* cited by examiner

*Primary Examiner* — Sinh Tran
*Assistant Examiner* — Shahbaz Nazrul
(74) *Attorney, Agent, or Firm* — Barnes & Thornburg LLP (57) ABSTRACT

An image sensor (810) comprises a plurality of image pixels (R, G, B) and a plurality of focus-pixels (F), each focus-pixel comprising a light shield (51a, 51b) for partly shielding the focus-pixel from incident light so as to obtain a focus-related signal in a first mode of operation. The image sensor further comprises additional circuitry for processing the focus-related signal, which additional circuitry is conveniently located underneath the light shields. The additional circuitry may be adapted for accumulating the charge of two focus-pixels (F1a, F2a), e.g. by charge binning, and for providing the accumulated charge in a second mode of operation.

9 Claims, 9 Drawing Sheets

IMAGE SENSOR WITH FOCUS-DETECTION PIXELS, AND METHOD FOR READING FOCUS-INFORMATION

FIELD OF THE INVENTION

The invention relates to the field of image sensors, and more particularly to image sensors having image pixels and focus detection pixels partly shielded by a light shield.

BACKGROUND OF THE INVENTION

Solid-state image sensors, in particular for example CMOS image sensors are known in the art. Many modern CMOS sensors are overlaid with a colour filter array (CFA) for obtaining three (or more) colour components, e.g. red, green and blue. Commercially the most commonly used CFA configuration is the so called "Bayer configuration". It has a pattern of four pixels arranged in a square, two opposite corners being taken by green pixels, the other two corners being taken by a red pixel and a blue pixel, respectively.

As is well known in the art, during imaging, focusing the lens in a correct position with respect to the image sensor is important for capturing sharp images. An important aspect of modern digital cameras is auto-focus, where the focussing of the lens is performed automatically.

Several companies have sensors and/or cameras on the market provided with "drop-in" pixels that can function as "auto-focus" pixels. That means that some of the standard (image) pixels are replaced by auto-focus pixels, which are dedicated for focusing. Examples of such sensors can be found in commercially available cameras from e.g. Fuji, Nikon, Canon.

U.S. Pat. No. 8,009,223(B2) describes a digital camera having an image sensor with both "image pixels" and "focus-detection pixels" (also referred to as "focus-pixels"). The focus-pixels are different from the neighbouring image pixels, and are designed for providing information for automatically focusing the lens. The focus-pixels do not contribute to the normal shooting of an image, i.e. they do not provide actual image data. An algorithm is described for determining defocus amount, and for adjusting the position of the lens accordingly.

Such focus-pixels have the big advantage that they are located on the sensor itself (no extra optics, no extra hardware required) and that they allow the complete auto-focusing system built around it to work extremely fast, which is particularly important for video capturing.

It should be noted that the auto-focus pixels should preferably work under all kinds of illumination levels, also in very low-light conditions, which is a problem of present image sensors. In currently known imagers, once the light input comes below a pre-determined threshold, the auto-focusing does not work correctly anymore.

SUMMARY OF THE INVENTION

It is an object of embodiments of the present invention to provide a good image sensor, capable of auto-focusing at low-light conditions.

This objective is accomplished by a method and device according to embodiments of the present invention.

It is an advantage of embodiments of the present invention that an image sensor comprising auto-focus pixels is provided, which is capable of correctly focusing also under lower light conditions than is possible with commercially available image sensors.

In a first aspect, the present invention provides an image sensor comprising a plurality of image pixels and a plurality of focus-pixels, each focus-pixel comprising circuitry for converting incident light into an electrical signal and for allowing read-out of the electrical signal, and a light shield for partly shielding the focus-pixel from the incident light so as to obtain a focus-related signal. In accordance with embodiments of the present invention, the image sensor further comprises additional circuitry for processing the focus-related signal delivered by the focus pixels, wherein the additional circuitry is physically located underneath the light shields.

The additional circuitry may include an active element, an active element being defined as an electrical component which requires a control signal to operate. An example of an active element is a switch for switching on or off binning of charges obtained from a plurality of focus pixels, or an amplifier for amplifying signals obtained from focus pixels. A particular type of implementation of such active element is by means of a transistor. In embodiments of the present invention, the additional circuitry may include passive elements, such as memory elements for storing signals, comparators for comparing signals obtained from focus pixels, capacitive elements for increasing the capacitance of the floating gate.

Possible examples of useful additional circuitry are: (1) circuitry for pre-amplification of the analog signal that is emanating from the focus pixels, (2) circuitry for charge binning, i.e. adding charge packets of two or more focus pixels together in the charge domain, (3) circuitry for thresholding the signal delivered by the focus pixels, (4) circuitry for storing the signal delivered by the focus pixels, so as to allow reading stored information at a convenient time, (5) circuitry for increasing the capacitance of the floating gate of the focus pixels, which may be used as overflow memory, so as to extend the dynamic range of the pixel; but other additional circuitry may also be used and conveniently be positioned underneath the light shields. In particular embodiments, the additional circuitry includes a switching device for switching between a first mode in which charge binning takes place, and a second mode in which no charge binning takes place.

It is an advantage to use part of the chip area, which today is implemented as storage capacity, but which is not needed because the amount of incident light is limited by the light shield, for other practical (useful) purposes.

It is an advantage that this can be implemented without considerable layout modifications to the existing pixel layout, as only part of the "redundant" portion needs to be modified.

It is an advantage that in this way functionality can be added to the image sensor without any area increase, and thus that the substrate material, e.g. silicon, is more efficiently used.

In an embodiment of the image sensor, the plurality of focus-pixels comprises at least a first and a second focus-pixel forming a first pair, and a third and a fourth focus-pixel forming a second pair. Each pair of focus-pixels comprises a pair of corresponding light shields, and each focus-pixel is adapted for storing an amount of charge dependent on the incident light, and for providing the individual charge in a first mode of operation. The additional circuitry is adapted for accumulating the charge of the first and the third focus-pixel forming a first couple, and for accumulating the charge of the second and the fourth focus-pixel forming a second couple, and for providing the accumulated charge in a second mode of operation. Furthermore, the additional circuitry comprises at least one transistor located under the light shields of the focus-pixels.

By accumulating the charge stored on two (or more, e.g. a number N) focus-pixels, the amount of charge is substantially doubled (or tripled, or N-fold). Since the focus pixels have a non-transparent shield partly covering the space of the focus pixel, e.g. about 50% of the space, the focus pixels are typically less sensitive than the image pixels. However, their signals are crucial for capturing sharp images. Under normal light conditions, the focus pixels of the image sensor function in their normal way (first mode), and each focus pixel provides a focus-related signal, which can be used by a camera for focusing a lens. However, under reduced light conditions, the image sensor of the present invention can be put in a second mode of operation, wherein the charges of two (or more) focus-pixels are accumulated (added) before read-out and digitization. This improves the signal-to-noise ratio of the focus-related signals, which allows a good lens position even at reduced lighting conditions (e.g. in relatively dark scenes).

It is an advantage of embodiments of this image sensor, that it is capable of correctly focusing the lens, even at reduced light conditions. It is noted that noise (e.g. temporal noise) on the signal from the focus pixels is usually much more severe than noise (e.g. temporal noise) on the signal from the image pixels. Indeed, if the lens is not correctly focused, a blurry picture will result. A sharp picture with noisy image data may still be usable for many applications (e.g. for number plate recognition), whereas a blurry picture with the noise of the image data, is generally useless. It is thus important that the lens is well focused, even under reduced lighting conditions.

It is an advantage of embodiments of the present invention, that the extra circuitry for accumulating the charges, can at least partly be located under the shielded portion. Whereas in the prior art the area occupied by the focus pixels is identical to that of normal image pixels, the area under the light shield is not efficiently used, because the amount of charge that can be captured by the shielded focus pixel is only a fraction of that of a normal pixel (e.g. about 50% or even less, in view of the presence of the light shield and the fact that the integration time for focussing is often much smaller than the integration time for imaging), thus only half of the space (or less) is required for storing the charge. It is thus an advantage of embodiments of the present invention that the semiconductor, e.g. silicon, area, especially under the shield, is more efficiently used.

It is an advantage of embodiments of the present invention that the image sensor can provide focus signals with an increased signal-to-noise ratio, especially under reduced (e.g. dark) lighting conditions. By accumulating the charge of two focus pixels, the signal is substantially doubled, thus the temporal noise is substantially divided by two.

It is essential to keep the light shield, because it blocks e.g. a red fraction of the light which could otherwise penetrate deep into the sensor, and free electrons which may migrate to the image pixels or the focus pixels. It is important to keep the shielded area completely dark.

It is an advantage of accumulating the charge from two (or more) focus-pixels, that there is substantially no speed penalty, thus the lens can be focused in substantially the same time period as is the case with the prior art solutions. This is especially important for video capturing.

In an embodiment of the image sensor the first, second, third and fourth focus-pixel comprises a first, second, third and fourth photodiode respectively, and the additional circuitry for accumulating the charge comprises a first transfer transistor for adding the charge from the first photodiode and the third photodiode, and a second transfer transistor for accumulating the charge from the second photodiode and the fourth photodiode.

It is an advantage of such a circuit that it occupies only a small amount of space, which easily fits in the area underneath the light shield.

In an embodiment of the image sensor, the first couple comprises a first amplifier located under the light shields of the first and/or third focus-pixel, and the second couple comprises a second amplifier located under the light shields of the second and/or fourth focus-pixel.

It is an advantage of such a circuit that the amplitude of the focus signal can be further increased, thus allowing correct focusing at even further reduced lighting conditions.

In an embodiment of the image sensor, the light shield of each focus pixel covers 40% to 60% of the pixel area, preferably about 50%.

In a second aspect, the present invention provides a digital camera comprising an image sensor as described above, and a lens for focusing incident light on the image sensor, and a control circuit adapted for reading the focus-related signals from the focus-pixels and for controlling the relative position of the lens and the image sensor accordingly.

In a third aspect, the present invention provides a method for reading focus information from an image sensor comprising a plurality of image pixels and a plurality of focus-pixels, the plurality of focus-pixels comprising at least a first and a second focus-pixel forming a first pair, and a third and a fourth focus-pixel forming a second pair, the pair of focus-pixels comprising a pair of corresponding light shields for partly shielding the focus-pixels from incident light so as to obtain focus-related information. Each focus-pixel is adapted for storing an amount of charge dependent on the incident light, and for providing the focus-related signal in a first mode of operation. The image sensor further comprises circuitry for accumulating the charge of the first and the third focus-pixel forming a first couple, and for accumulating the charge of the second and the fourth focus-pixel forming a second couple, and for providing the accumulated charges as the focus related signals in a second mode of operation. The circuitry comprises active elements being located under the light shields of the focus-pixels. The method comprises the steps of: (1) obtaining focus information from the image sensor configured in the first mode; and (2) determining lighting information from the focus information, and if the lighting information is below a predefined threshold, reading focus information from the image sensor configured in the second mode.

It is an advantage of this method that it provides substantially the same defocus-information as prior art circuit, and at substantially the same speed, when configured in the first mode of operation (e.g. under sufficient lighting conditions), but is able to provide defocus-information with an improved signal-to-noise ratio under insufficient lighting conditions. The latter condition may e.g. be detected after first reading the focus-pixels in the first mode, and determining whether the average value of the focus pixels is below a predefined threshold value, but other algorithms may also be used, e.g. based on the minimum value, or based on histogram information.

It is an advantage of this method that the decision whether to use the first mode or the second mode can be taken automatically by the camera, without user interaction, and yields the best result under all circumstances.

Alternatively, it is also possible to first obtain the focus information from the image sensor configured in the second mode, and determining lighting information from the focus information, and if the lighting information is above a predefined threshold (e.g. clipping to the maximum value of the A/D convertor), to then read focus information from the image sensor configured in the first mode. But assuming that most images are taken under sufficient lighting conditions, this would (on average) be marginally slower.

In a fourth aspect, the present invention provides a method for focusing a movable lens of a digital camera comprising the lens and an image sensor as described above. The method comprises reading focus information from the image sensor as described above; and focusing the lens based on the focus information.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Any reference signs in the claims shall not be construed as limiting the scope. In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illus-trative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

When, in the context of the present invention, reference is made to "image pixels", reference is made to light-sensitive sensor elements of an image sensor array provided for capturing image data. The image pixels are typically overlaid with a color filter. For example, if a so called "Bayer filter" is used as a color filter, three kinds of image pixels are created: R-pixels for capturing a red light component, G-pixels for capturing a green light component, and B-pixels for capturing a blue light component; but other color filters may also be used. In the context of the present invention, image pixels are indicated with reference "I", when it is not important to distinguish between R, G or B pixels.

When in the context of the present invention, reference is made to "focus-detection-pixels" or "focus-pixels" or "auto-focus pixels", reference is made to light-sensitive elements of an image sensor array especially adapted and arranged for detecting defocus-information. These pixels are usually not overlaid with the same color filter as the image pixels. Part of these pixels may be deliberately shielded by a metal screen having an aperture.

In the context of the present invention, a "focus-pixel pair" is a pair of neighboring focus-pixels. A "group of focus-pixel pairs" comprises a plurality of focus-pixel pairs, these pairs neighboring or not neighboring one another.

With "a pair of corresponding light shields" in the context of the present invention is meant a pair of light shields each partly covering a focus-pixel in a focus-pixel pair, wherein the corresponding light shields cover different portions of the pixels in the pair, e.g. an upper portion and a lower portion.

With "a couple of corresponding focus pixels" in the context of the present invention is meant two focus pixels that have similar light shields, e.g. both covering an upper portion of the pixel. Such pixels provide signals that may be combined.

With "active element" is meant an electrical component which requires a control signal or external power to operate. An example of an active element is a transistor. A simple pad made of resistors is passive; it does not require a control signal to operate.

Figure 1:
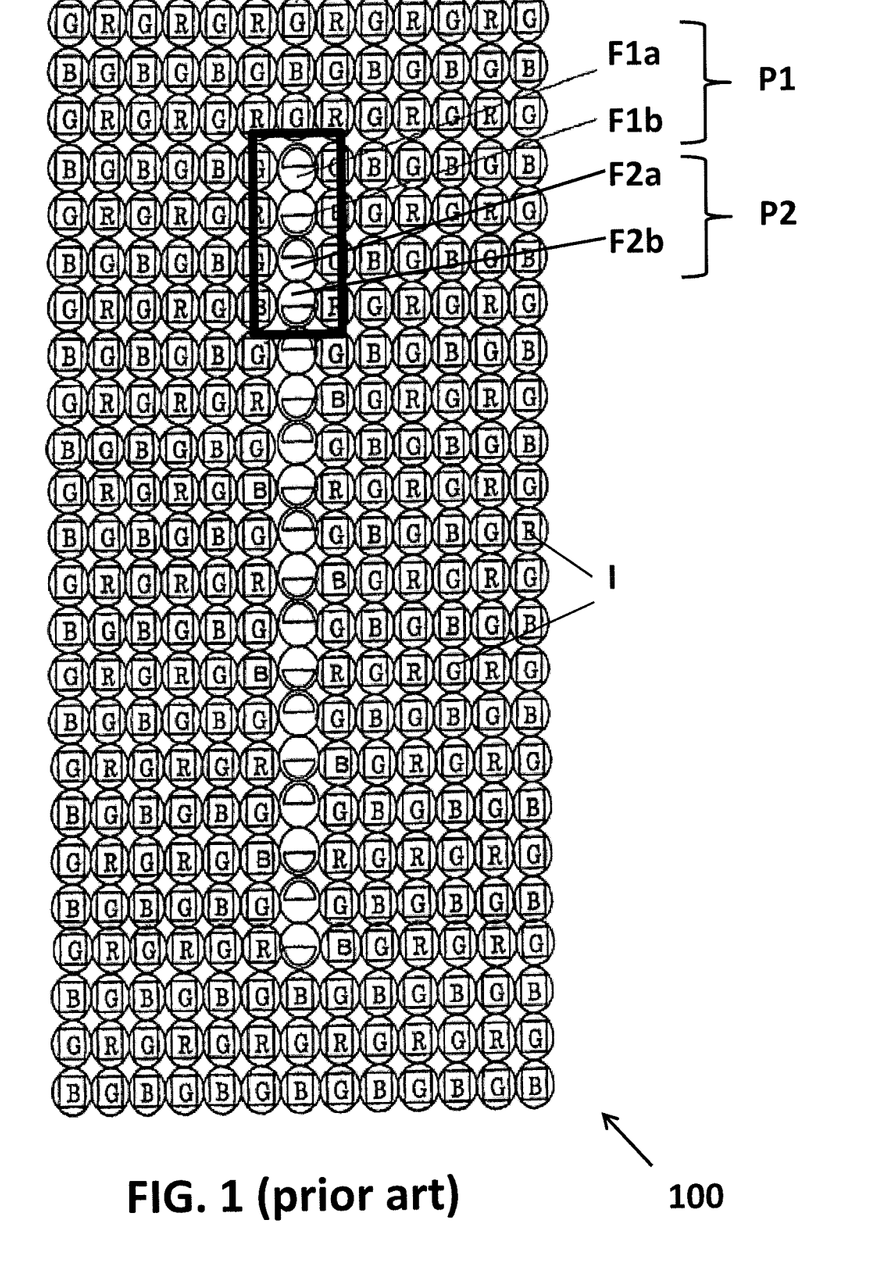
FIG. 1 shows an example of a prior art image sensor comprising image pixels and focus-detection pixels.

FIG. 1 is a copy of FIG. 3 of U.S. Pat. No. 8,009,223(B2) and shows an example of a two-dimensional image sensor array 100 (or a part thereof) comprising image pixels (indicated by references "R", "G" and "B"), herein further indicated with reference "I", and one column of focus-detection pixels "F". It is irrelevant for the present invention whether the image pixels "I", close to or far away from the focus pixels "F", do or do not follow the standard Bayer pattern, or any other color pattern. But of course, the estimation of image data for the pixel locations occupied by the focus-pixels, which is usually done by interpolation of neighboring image pixels, will be dependent on the particular arrangement chosen. As described in detail in the cited U.S. Pat. No. 8,009,223, incorporated herein by reference, focus-pixels "F" are typically arranged on a partial row or partial column of the image sensor array, but other arrangements may also be used, and typically occur in pairs P1, P2 having a specific phase relation for allowing focus-detection. Although two embodiments of focus pixels are described in the cited patent, the present invention relates only to the embodiment shown in FIG. 1, where each focus pixel F occupies one pixel location and is for about 50% shielded by a metal light shield. The cited patent also discloses image-interpolation methods for estimating image data for the pixel locations occupied by the focus-pixels, and focus-detection methods. Therefore, they need not be described further here. The reader may consult the cited patent or other literature for further details, if desired.

Figure 2A:
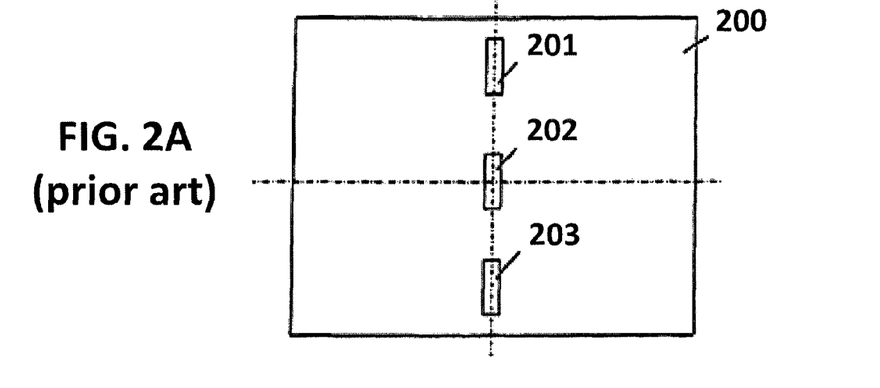
FIGS. 2A, 2B and 2C show several examples of possible arrangements of focus-detection pixels, known in the art.
Figure 2B:
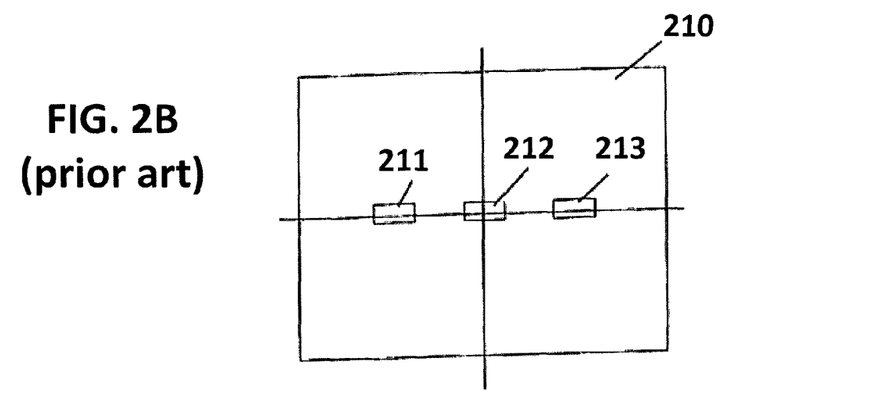
Figure 2C:
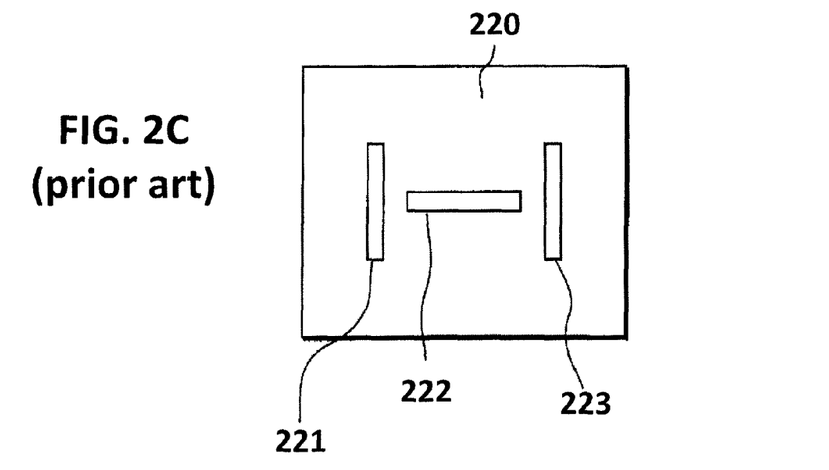

FIGS. 2A, 2B and 2C show several examples of possible arrangements of focus-detection pixels, known in the art. FIG. 2A shows an example of three focus detection pixel column areas, in particular focus detection areas 201, 202 and 203 set at the center and on the upper side and the lower side of a rectangular photographic image sensor array 200. A plurality of focus detection pixels F are arranged in a straight line along the longer side of each rectangular focus detection area. FIG. 2B shows a sensor array 210 having three focus-pixel areas 211, 212 and 213 arranged horizontally. FIG. 2C, extracted from U.S. Pat. No. 6,781,632 shows yet another example of an image sensor 220, where focus pixel areas 221, 222, 223 are arranged both horizontally and vertically. These are but three examples of possible arrangements of focus pixels F in an image sensor array, but the present invention is not limited thereto, and other, more complex, or simpler arrangements may also be used, for example two parallel rows whereby one pixel of a focus pixel pair is located in the upper row, and the other pixel of the focus pixel pair is located in the lower row. However, for the present invention, at least two pairs of corresponding focus pixels need to be located on a same row or a same column of the image sensor array. Although preferred, it is not absolutely required that the at least two pairs P1, P2 of focus pixels are located in or near the center of the image sensor.

Figure 3:
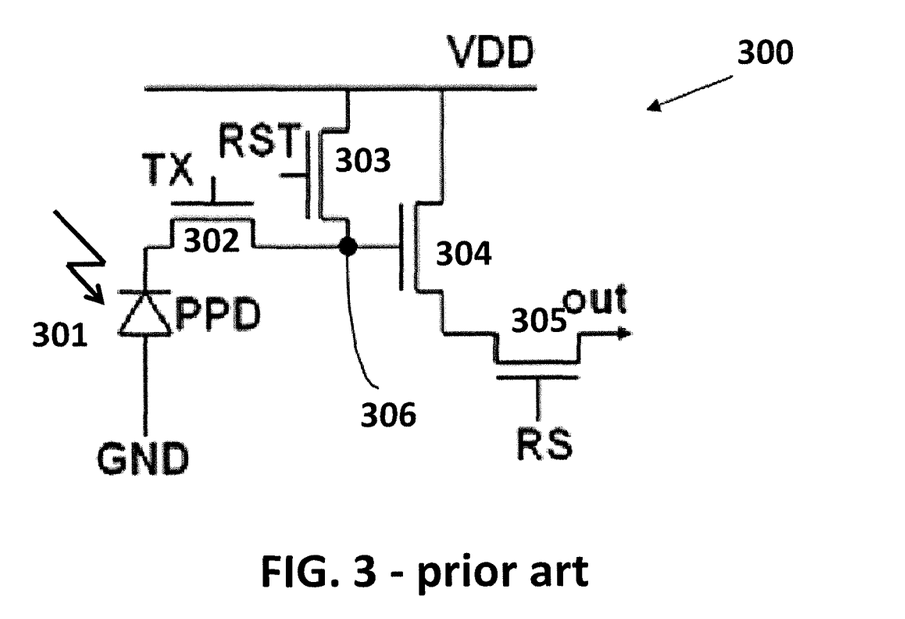
FIG. 3 shows a circuit diagram of the so called "4T" image pixel architecture for converting incident light into an electrical signal and for allowing read-out of the electrical signal, known in the art.

FIG. 3 illustrates, as an example only, a so called "4T" (four-transistor) pixel configuration 300 for a CMOS image sensor, as is known in the art, and as can be used in the image sensor array of the present invention. All transistors in the pixel 300 are MOS transistors. The pixel 300 illustrated in FIG. 3 comprises a photoreceptor 301, in the example illustrated a pinned photodiode PPD, for converting impinging radiation into electric charge. The pixel 300 furthermore includes a sample and hold transistor 302 for transferring charge generated by the photoreceptor 301 towards a sense node 306 (also known as "floating diffusion"), a reset transistor 303 for resetting the sense node 306 to a starting value (e.g. the supply voltage VDD), a source follower transistor 304 (also called "amplifier") for converting the transferred charge into a voltage, and a select transistor 305 for actually putting that voltage onto a readout-line, e.g. on a column line. This circuit can be used for both image pixels I and focus-pixels F. However, image sensors having focus pixels are preferably adapted for separate read-out of the focus pixels, either using the same read-out circuitry as is used for reading out the image pixels, or by using dedicated readout-circuitry. As such circuits are known in the art, they need not be further described here. The charge, indicative for the brightness of the incoming light, is stored on the floating diffusion 306, and can be read-out by activating select transistor 305, which places a voltage on the output OUT (which may e.g. be connected to a column line, not shown), and which signal may e.g. be amplified and/or digitized as will be described with respect to FIG. 8. The charge accumulated on the sense node 306 is "erased" when the reset transistor 303 is activated. It is to be noted that the invention is not limited to pixels (or sensor cells) with the 4T-pixel architecture, and that other pixel architectures may also be used.

Figure 4A:
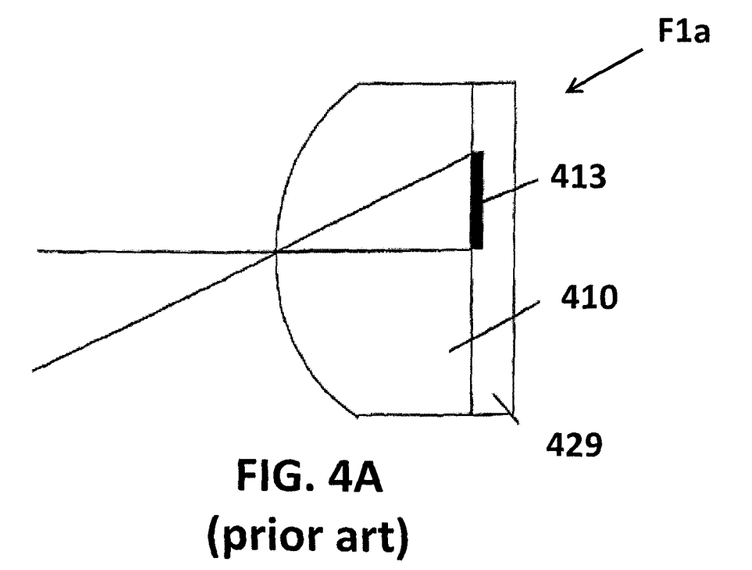
FIG. 4A and FIG. 4B show a cross section of a pair of two focus pixels, known in the art.
Figure 4B:
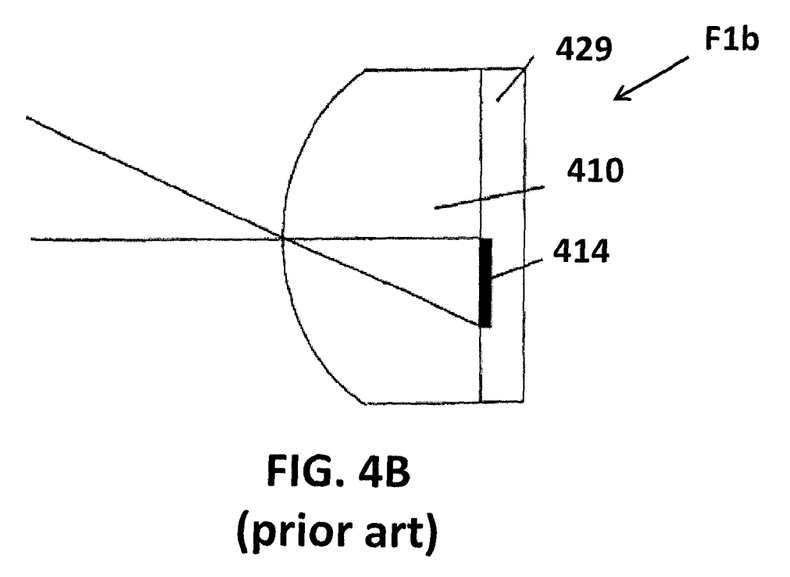

FIG. 4A is a sectional view of the focus detection pixel F1a in FIG. 1. The focus detection pixel F1a may include a micro-lens 410 disposed to the front of the photoelectric conversion unit 413. An image of the photoelectric conversion unit 413 may be projected frontward via the micro-lens 410. The photoelectric conversion unit 413 is formed on the semiconductor circuit substrate 429, with the micro-lens 410 fixed as an integrated part thereof through a semiconductor image sensor manufacturing process. Likewise, FIG. 4B is a sectional view of a focus detection pixel F1*b* of FIG. 1, comprising a photoelectric conversion unit 414 formed on the semiconductor substrate 429.

Each focus pixel F is provided with a light shield (e.g. made out of a non-transparent layer, e.g. a metal layer) that covers e.g. an upper or lower part of the pixel area, resulting in a sensitive area that is only about 50% of the regular pixel area, and is located at the top or bottom side of the pixel. Alternatively other complementary parts could be covered, e.g. the left side of one focus pixel of the pair, and the right side of the other focus pixel of the pair.

Although not disclosed explicitly, it should be noted that in existing designs, the focus pixels only have a light-sensitive area of 50% (in view of the light shield being present), but still a regular photodiode (i.e. having the same size as for the image pixels) is used underneath the light shield, so that the charge-storage capacity is still 100% (as for the image pixels). The inventor has realized that this storage capacity is in fact not required, and thus part of the area under the shield is actually "redundant", while it could be used for other practical purposes.

One such purpose is increasing the signal level delivered by the focus pixels, without decreasing the S/N-ratio. This allows improved focusing of the camera lens even under limited lighting conditions. In accordance with embodiments of the present invention, the signal increase can be implemented in several ways, for example (but without limiting the invention thereto):

1) Pre-amplification of the analog signal that is emanating from the focus pixels. Amplification of the analog signal close to the source where it is generated will make the signal more robust against e.g. noise which is added further on, and ultimately in the A/D convertors, thus such pre-amplification will improve the S/N (signal to noise) ratio of the signal. It is to be noted that the term "pre-amplification" is used, as opposed to "amplification", to differentiate from the analog processing that occurs in the analog processing block 816 of FIG. 8. In order to perform the pre-amplification in accordance with embodiments of the present invention, pre-amplification circuitry may be provided as additional circuitry associated with each focus pixel, and physically located underneath the shield thereof.

2) Charge binning, i.e. adding charge packets of two (or more, in general NR), auto-focus pixels together. This offers the advantage that the S/N ratio of the signal is improved approximately by a factor of NR, e.g. a factor of two. The inventor has noted, however, that adding the charge of two direct neighboring focus pixels, (e.g. of F1*a* and F1*b*) shown in FIG. 1 will destroy the focusing principle, because of their special geometrical structure (as illustrated in FIG. 4A and FIG. 4B). However, when the charge of "even numbered" focus pixels (e.g. F1*a* and F2*a*) are added, and the charge of "odd numbered" focus pixels (e.g. F1*b* and F2*b*) are added together, the focusing principle still works. Admittedly, adding the information of focus pixels together will slightly decrease the quality of the focus algorithm (as compared to the case where no adding is performed, also referred to as the "first mode"), but under particular lighting conditions, the overall result of focusing while binning charges (also referred to as the "second mode") is better than without binning. In accordance with embodiments of the present invention, charge binning circuitry can be provided associated with the focus pixels, in addition to the circuitry for converting light into an electrical signal and for providing the electrical signal at an output (e.g. the circuitry shown in FIG. 3), and would be physically located underneath the light shield of these focus pixels. It should be noted that a larger (e.g. double) focus signal with an improved S/N ratio could also be provided by increasing (e.g. doubling) the measurement time, but the latter would decrease the speed of bringing the lens in focus, which is undesirable because it could be too late to capture fast moving objects, and it would also increase the risk of moving the camera while measuring, which is also highly undesirable, which may prolong the auto-focusing even further, or may result in a sub-optimal lens-position, which would blur the image to be captured. As far as known to the inventor, charge binning has not been applied before for focus pixels.

3) Thresholding the signal delivered by the focus pixels: this results in a binary focus signal, meaning additional circuitry is provided to check whether the signal provided by the focus pixel is larger than a predefined threshold, in which case the output would be logical '1', or smaller than the predefined threshold, in which case the output would be logical '0'. Thresholding circuitry can be provided associated with each focus pixel as additional circuitry, and can be physically located underneath the light shields of the focus pixels.

It is an important advantage that the additional components (e.g. transistors) for increasing the signal level of the focus pixels can be implemented underneath the light shields of the focus pixels. By adding one or more transistors adapted to be used as switches, as amplifier (or part of an amplifier) or for thresholding, more efficient use is made of the available semiconductor material, e.g. silicon. It is also an important advantage that this can be implemented without considerable layout modifications to the existing pixel layout, as only part of the "redundant" portion needs to be modified. Some extra control signals are however required, for deciding "in which mode" the focusing will be performed, as will be described next.

Figure 5:
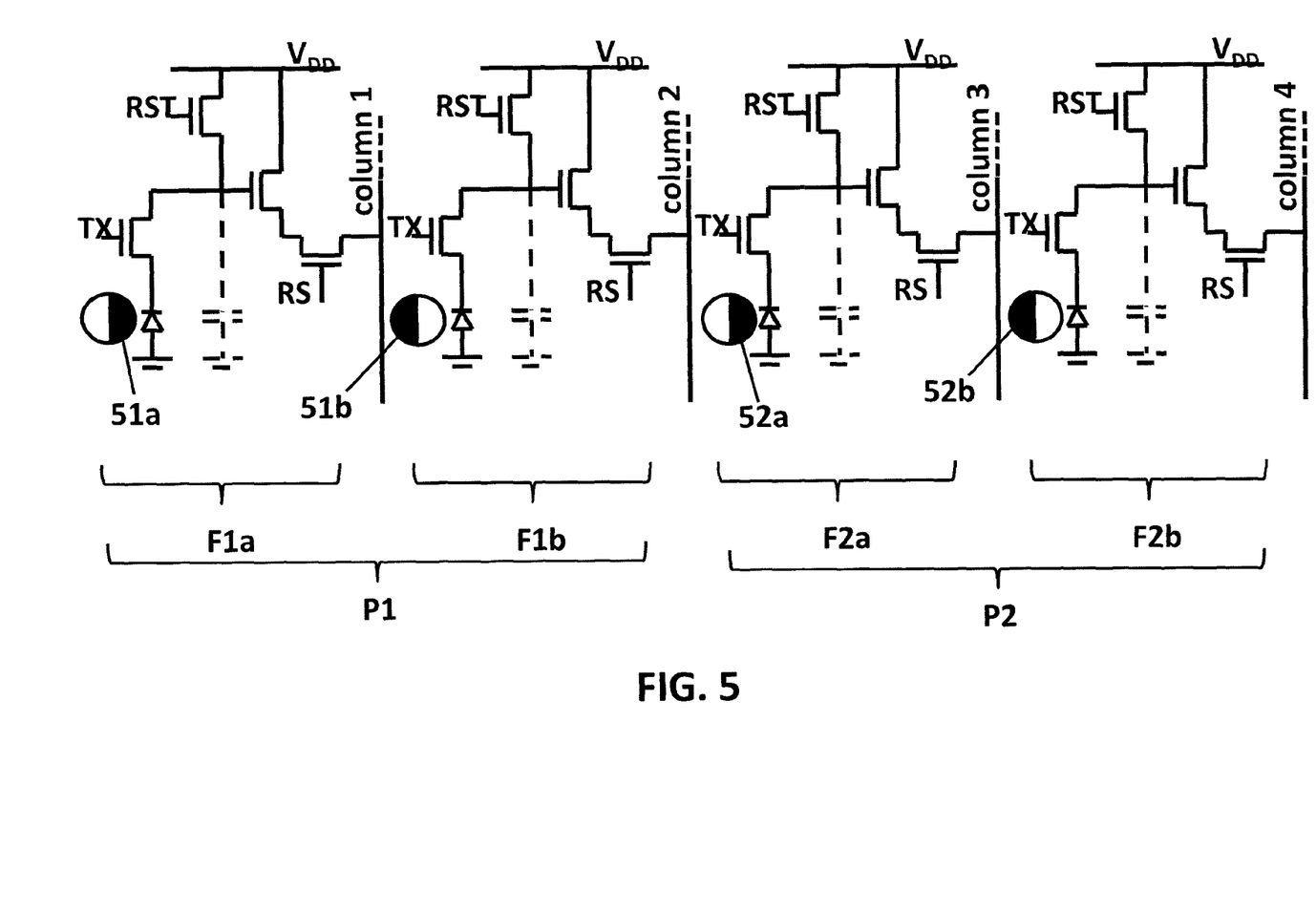
FIG. 5 shows an example of the electrical circuit of four focus pixels as may be used in a prior art image sensor with column readout.

FIG. 5 shows an example of how a group of two focus pixel pairs P1, P2 in a row may be implemented in an existing image sensor having a column-level ADC architecture. This architecture is used as an example, to illustrate the principle of the invention, but it is noted that the invention would also work for an image sensor with a column level ADC architecture wherein the focus pixels are located on a single column, except that in that case the focus pixels could not be read out simultaneously, but by addressing each row individually. Of course, the invention would also work for image sensors with a dedicated read-out circuit for the focus-pixels. Referring back to FIG. 5, each focus pixel F1*a*, F1*b*, F1*a*, F2*b* of the focus-pixel pairs P1, P2 has a light shield (schematically indicated next to the photodiode, although in actual implementations it is located on top of the photodiode). The reader will recognize the 4T pixel architecture with a pinned photodiode, as shown in FIG. 3. Each pixel has a reset transistor 303, a row select transistor 305, a transfer transistor 302, the transistors being controlled via control signals RST, RS and TX respectively. In the parallel ADC-architecture, all focus pixels in a row are read out simultaneously, and the control signals RST, RS and TX are common for all pixels on one row.

The pixels also have a source follower transistor 304, and a pinned photodiode PPD, and a floating diffusion, also called "readout node" (indicated by the dashed capacitor). In the example of FIG. 5 each photodiode PPD has its own output stage, however that is not essential for the invention, and two or more photodiodes may also share a single output stage. Because of the functionality of the focus pixels, about half of the pixel surface is covered by a light shield. This is illustrated in FIG. 5 by means of the circles of which 50% is made not transparent because of the coverage by a light shield, but other shapes, e.g. regular shapes such as square, rectangle, diamond, hexagon shapes, or even irregular shapes could also be used. The charges of all focus-pixels in a same row (four in the case shown here) are read-out simultaneously in known ways, e.g. by activating the control signals RST, TX, RS in a particular sequence, for example as illustrated in FIG. 9.

Figure 9:
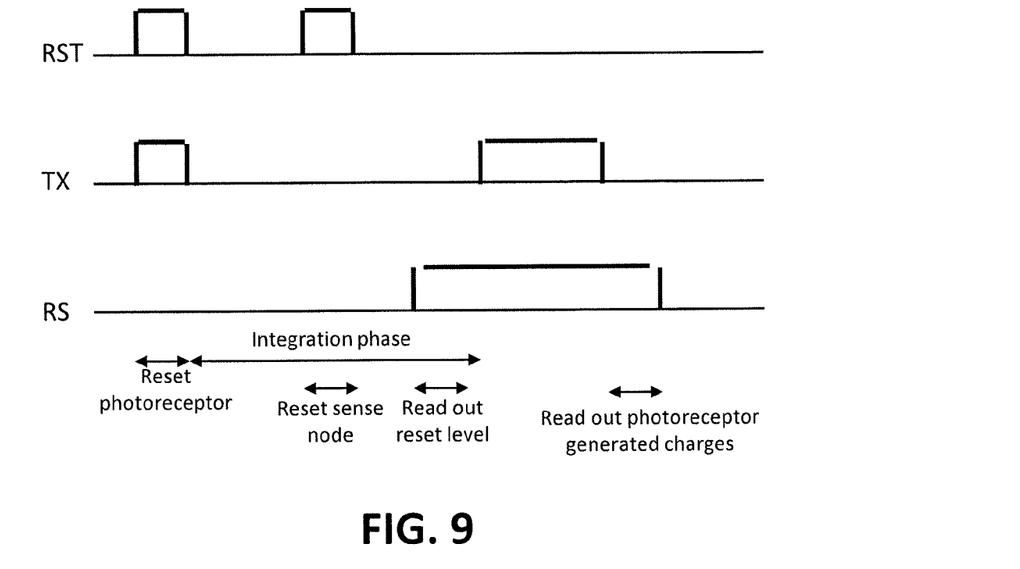
FIG. 9 illustrates a timing diagram according to a first mode of reading out the pixels of FIG. 6.

In the operation as diagrammatically illustrated in the example of FIG. 9, first all pixels in a particular row are being reset. This may be done by setting the reset line RST and the transfer line TX associated with that particular row high, e.g. equal to or above VDD. Setting the reset line RST high turns on reset transistor 303, and setting the transfer line TX high turns on sample and hold transistor 302, and this sets the voltage across the photoreceptor 301 to a fixed starting value.

The reset line RST and the TX signal are then set to low (e.g. ground), thereby turning off reset transistor 303 and turning off sample and hold transistor 302 and beginning an integration phase. While the reset line RST and the transfer line TX are low, a pixel 300 integrates the amount of radiation focused onto its photoreceptor 301, and photoreceptor 301 discharges from the reset level downward. At the end of the integration phase, just before read-out of the pixel, the reset line RST is activated again to reset the sense node 306 by means of the reset transistor 303. After closing the reset transistor 303, the voltage present at the sense node may be sampled and stored in the analog domain. Next the transfer line TX is set to high to start the readout phase of the radiation-generated information. Setting the transfer line TX to high turns on sample and hold transistor 302, and causes the charge on the photoreceptor 301 to be transferred to a parasitic capacitance 500 at the node 306 connected to the gate of the source follower transistor 304. The transfer line TX is then set to low, thereby turning off sample and hold transistor 302. The voltage delivered by the source follower is sampled again, by setting the RS signal high (e.g. VDD), thus turning on sample and hold transistor 305, and is stored again in the analog domain. Thereafter, the sample and hold transistor 305 is again switched off, by setting the RS signal low (e.g. ground).

It will be clear for a person skilled in the art that the operational mode as illustrated with respect to FIG. 9 is an example only, and is not intended to be limiting for the present invention. Different pixels may have different operational principles, but even particular pixels may have different operational modes.

Figure 6:
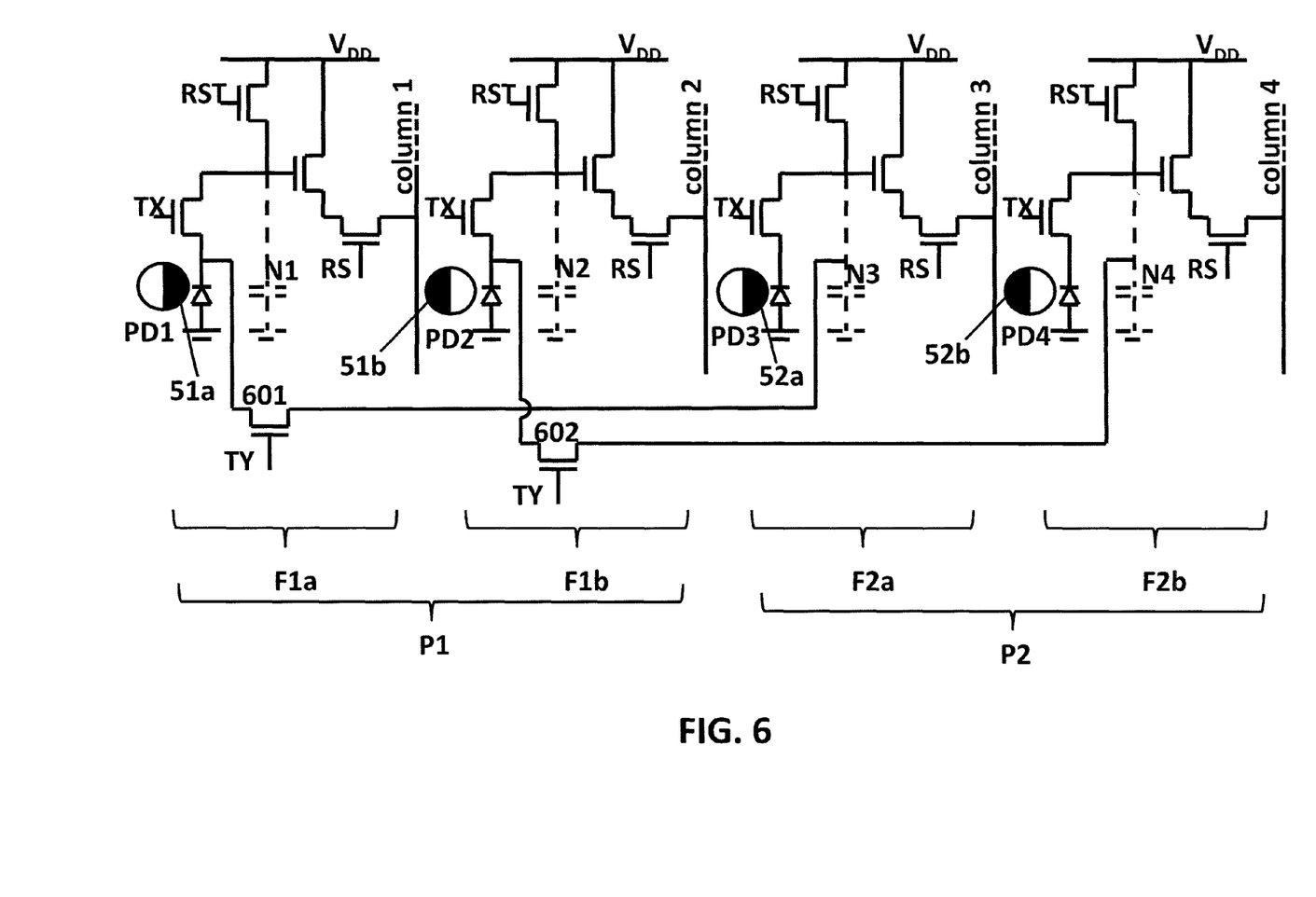
FIG. 6 shows an example of the electrical circuit of four focus pixels according to embodiments of the present invention. It comprises additional circuitry for processing the focus-related signal, which additional circuitry is physically located underneath the light shields (indicated in black).

FIG. 6 shows an example of how the schematic of the group of two focus pixel pairs P1, P2 shown in FIG. 5 may be modified for the case where switches, e.g. transistors, are added as additional circuitry to the focus pixel pairs, for allowing charge binning. Although this example only shows charge binning of two pixels, the invention is not limited thereto, and charge binning with more than two focus pixels is also possible, for example three, or four, or even more than four focus pixels.

As described above, these transistors are located underneath the light shields 51a, 51b, 52a, 52b. It is to be noted that the light shields are still required, even if the area of the photodiodes is reduced and replaced by additional circuitry, because the working principle of the focus pixels is based on partially shielding the light.

When comparing FIG. 6 and FIG. 5, it is clear that in principle the same pixel architecture is used, but in addition to the standard configuration, extra binning transistors 601, 602 are added, controlled by a TY control signal. The TY control signals may be generated by a same control block (not shown) that generates the RST, TX and RS signals, or by another control block. These binning transistors 601, 602 allow the image sensor to operate in a first mode, wherein the charge of each focus pixel is read-out individually (similar to FIG. 5), or in a second mode, wherein the charge of each focus pixel F1a, F1b of the first focus pixel pair P1 is added to the charge of the corresponding focus pixel F2a, F2b of the neighboring focus pixel pair P2 respectively, called "charge binning". By means of the TY control signals, charge from two focus pixels can be added so as to increase the signal-to-noise (S/N) ratio of the resulting signal.

In case of the first mode, the operation may for example be as schematically set out in and explained with respect to FIG. 9. In that case, the switches, e.g. transistors 601, 602, are left open.

Figure 10:
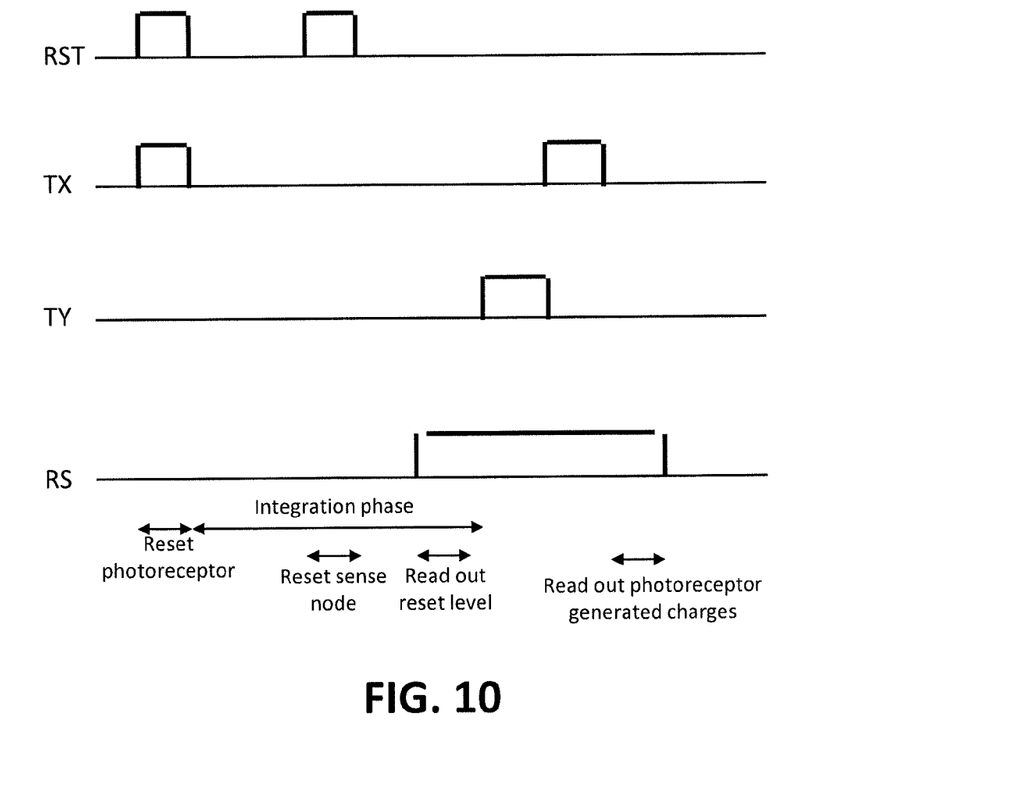
FIG. 10 illustrates a timing diagram according to a second mode of reading out the pixels of FI The drawings are only schematic and are non-limiting. In the drawings, the size of some of the elements may be exaggerated and not drawn on scale for illustrative purposes.

The operation of the group of focus pixel pairs illustrated in FIG. 6 in the second mode is diagrammatically illustrated, as an example of an operation method only, in FIG. 10.

In the operation as diagrammatically illustrated in the example of FIG. 10, first all pixels in a particular row are being reset. This may be done by setting the reset line RST and the transfer line TX associated with that particular row high, e.g. equal to or above VDD. Setting the reset line RST high turns on reset transistor 303, and setting the transfer line TX high turns on sample and hold transistor 302, and this sets the voltage across the photoreceptor 301 to a fixed starting value.

The reset line RST and the TX signal are then set to low (e.g. ground), thereby turning off reset transistor 303 and turning off sample and hold transistor 302 and beginning an integration phase. While the reset line RST and the transfer line TX are low, a pixel 300 integrates the amount of radiation focused onto its photoreceptor 301, and photoreceptor 301 discharges from the reset level downward. At the end of the integration phase, just before read-out of the pixel, the reset line RST is activated again to reset the sense node 306 by means of the reset transistor 303. After closing the reset transistor 303, the voltage present at the sense node may be sampled and stored in the analog domain. Next the transfer line TY is set to high to store, in the example illustrated, the charge from the first pixel on the third readout node, and to store the charge from the second pixel on the fourth readout node. Setting the transfer line TY to high turns on sample and hold transistors 601, 602, and causes the charge on the photoreceptor 301 of pixels F1a, F1b to be transferred to a parasitic capacitance 500 at the node 306 connected to the gate of the source follower transistor 304 of a corresponding pixel F2a, F2b where the charges are to be added, respectively. The transfer line TY is then set to low, thereby turning off sample and hold transistors 601, 602. Immediately thereafter, the transfer line TX is set to high, to store and add the charge from the third pixel on the third readout node, and to store and add the charge from the fourth pixel on the fourth readout node. In principle also the charge from the first and second pixels are stored on the first and second readout nodes, but the charge content of the pixels is zero. The transfer line TX is then set to low, thereby turning off sample and hold transistors 302. The voltage delivered by the source followers is sampled, by setting the RS signal high (e.g. VDD), thus turning on sample and hold transistor 305, and is stored again in the analog domain. Thereafter, the sample and hold transistor 305 is again switched off, by setting the RS signal low (e.g. ground).

It will be clear for a person skilled in the art that the second operational mode as illustrated with respect to FIG. 10 is an example only, and is not intended to be limiting for the present invention. Different pixels may have different operational principles, but even particular pixels may have different operational modes.

Figure 8:
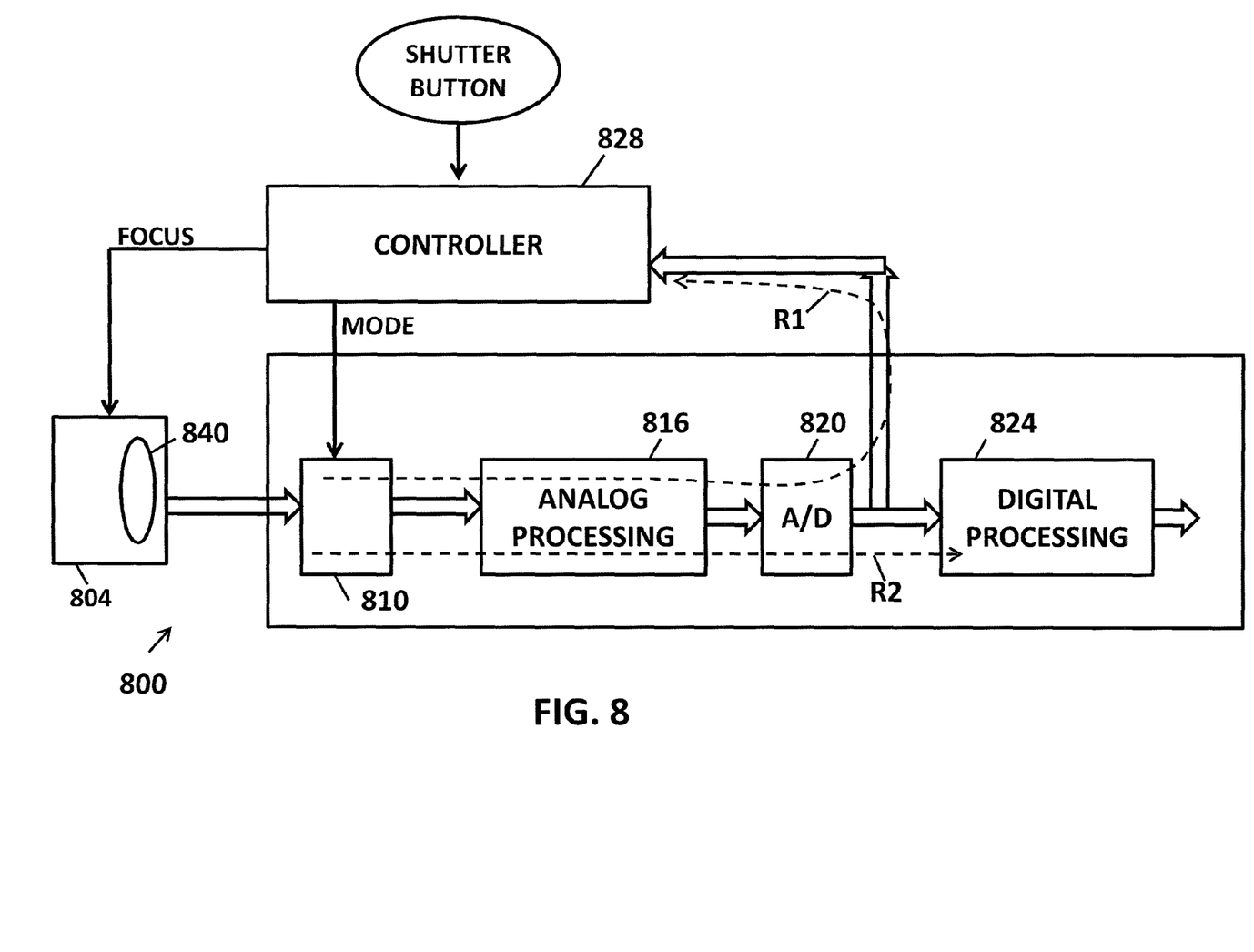
FIG. 8 shows an example of a block-diagram of an embodiment of a digital camera according to aspects of the present invention.

The above "second mode" will cause focus signals with an increased signal level to be present on column 3 and column 4, which may then be further processed in the analog domain (see block 816 of FIG. 8) or digitized (see block 820 of FIG. 8). It should be noted that this is just an example of how such a system can work. In reality a few more precautions need to be taken, because in the foregoing illustration e.g. the diode capacitance of the first and second pixel F1a, F1b will be larger because of the extra TY connection, and the readout node capacitance of the third and the fourth pixel F2a, F2b will be larger because of the extra TY connection. These issues can be solved e.g. by a proper design/lay-out and/or offset correction (in the analog processing block) and/or by correction in software during the digital signal processing (block 824 of FIG. 8).

It is mentioned that the total time for reading the focus pixels is substantially the same or only slightly larger when read in the second mode as compared to the first mode, because the exposure time is typically much larger (e.g. at least a factor 10) than the time required for actual readout of the pixel values.

The circuit of FIG. 6 can of course also work without binning, by not activating the TY-control signals, but by applying the pulse sequence as mentioned before in relation to FIG. 5.

In a practical implementation, as the light intensity is not known beforehand, the digital camera may first apply the normal mode (first mode) of operation for obtaining focus 7signals, assuming sufficient light intensity, as most pictures will be taken with sufficient light. If then, after reading the focus signals in the first mode, it appears that the incident light was very low, the focus signals are read again in the second mode, and the latter signals will be used for actually focusing the lens. Alternatively, the focus information may always be read in both the first mode and in the second mode, and one of the signals, e.g. the one with the highest amplitude without clipping could be used.

In an alternative embodiment (not illustrated, but a variant of FIG. 6), the binning transistors 601, 602 could be connected to the third respective fourth photodiode PD3, PD4 (instead of the first and second photodiode PD1, PD2), and the charge from the third respective fourth photodiode could have been transferred to the first respective second readout node N1, N2(instead of to N3, N4), and the combined charge from the first and third photodiode would be read-out on column 1 in similar way. Hence transfer of charges between pixels of auto-focus pixel pairs can be performed from left to right or from right to left, or from below to above or vice versa in case the focus pixels are located on a column.

Figure 7:
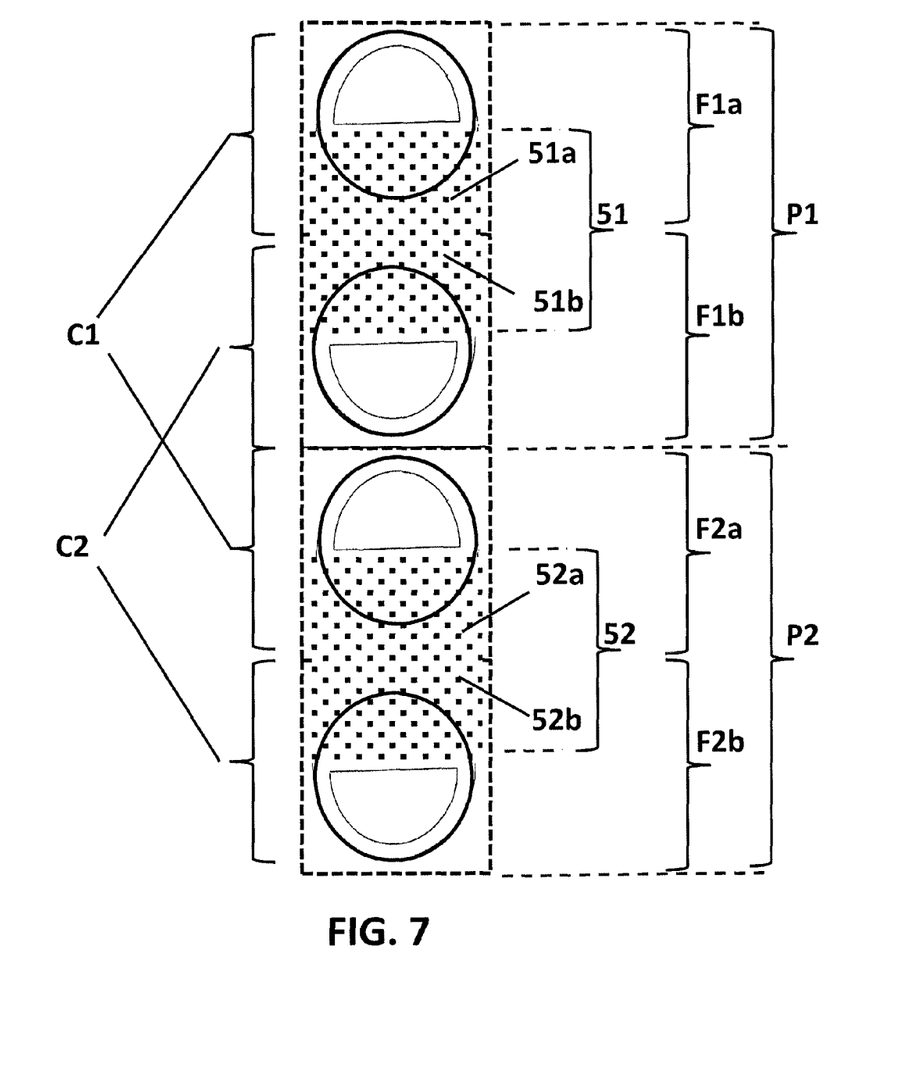
FIG. 7 shows four focus pixels forming two pairs and two couples according to aspects of the present invention. It comprises additional circuitry for processing the focus-related signal, which additional circuitry is physically located underneath the light shields (indicated by dotted regions).

FIG. 7 shows a top-view of part of the image sensor comprising the two focus pixel pairs P1, P2. The dotted areas indicate the light shields 51a, 51b, 52a, 52b, but thus also the portion of the semiconductor, e.g. silicon, area located under the light shields that can be used for locating the additional circuitry, according to aspects of the present invention, e.g. for locating the binning transistors 601, 602.

Having described the invention for charge binning, it should be noted that in fact also other additional circuitry can be placed under the light shield of the focus pixels, such as e.g. additional switches for averaging the charge of the focus pixels, or additional circuitry for comparing the charge present in the focus pixels, or additional circuitry for implementing a dual gain factor for the focus pixels, or any other form of high dynamic range (HDR) circuitry, or additional interconnect for allowing transfer of the focus information to a circuitry on another level of a stacked solution, or storage cells to store the focus pixel information so that the information can be reused after non-destructive readout, or combinations of these additional circuits.

FIG. 8 shows an example of a block-diagram of a digital camera 800 according to embodiments of the present invention. The digital camera 800 includes optics 804 that may have a conventional aperture (not shown), filter (not shown), and lens system 840 used to guide the incident light into the camera and onto an image sensor 810. The image sensor 810 comprises image pixels I and focus-detection pixels F, as described above. The focus-detection pixels F are adapted for providing (de-)focus information which can be retrieved from the focus pixels individually (when configured in the first mode), or can be retrieved from couples (or higher order groups) of focus pixels (when configured in the second mode). Both types of pixel values (both image pixels and focus pixels) may be subjected to analog processing in an analog processing block 816 before being forwarded to an array of analog-to-digital (A/D) converters 820 for digitizing the analog pixel values. The digitized values obtained from the focus pixels F, and indicative for the brightness of the scene, are routed to a control block 828 for determination of the (first or second) mode to be used. The image pixel values are routed to a digital processing block 824 and may be subjected to digital processing (e.g. cross-talk-correction, image data estimation for the locations occupied by the focus pixels, etc) before being provided as digitized image data or digitized video data, which may be stored e.g. after file formatting, on a digital memory (not shown). The controller 828, the image sensor array 810, the analog processing block 816, the A/D block 820 and the digital processing block 824 may be integrated in a single integrated circuit implemented in CMOS technology.

Route R1 indicates the path followed by the focus-detection data (charge, analog value, digital value) obtained from the focus pixels F into the controller 828. Route R2 indicates the path followed by the image related data (charge, analog value, digital value) obtained from the image pixels I into the digital processing block 824.

The analog processing block 816 may include known circuitry, such as e.g. correlated double sampling circuitry, as well as any gain and filtering, or offset correction.

The A/D converters in block 820 may comprise e.g. 8-bit or 10-bit or 12-bit or even more bits convertors.

The control block 828 may be implemented in hardware, or in a programmable controller, such as e.g. a DSP (digital signal processor), provided with an algorithm for reading a plurality of focus pixel values, and for controlling, based on the read values of the focus pixels, the position of the lens 840 using known algorithms.

The digital processing block 824 may also be implemented in hardware, or in a programmable DSP, which may be the same or another DSP than the control block 828.

The invention claimed is:
1. An image sensor comprising:
a plurality of image pixels; and
a plurality of focus-pixels, each focus-pixel comprising circuitry for converting incident light into an electrical signal and for allowing read-out of the electrical signal, and a light shield for partly shielding the focus-pixel from the incident light so as to obtain a focus-related signal;
characterized in that the image sensor further comprises additional circuitry for processing the focus-related signal delivered by the focus pixels, wherein the additional circuitry is physically located underneath the light shields of said focus pixels.

2. The image sensor according to claim 1, wherein the additional circuitry includes an active element.

3. The image sensor according to claim 1, wherein:
the plurality of focus-pixels comprises at least a first and a second focus-pixel forming a first pair, and a third and a fourth focus-pixel forming a second pair, each pair of focus-pixels comprising a pair of corresponding light shields, each focus-pixel being adapted for storing an amount of charge dependent on the incident light, and for providing the individual charge in a first mode of operation; and
wherein the additional circuitry is adapted for accumulating the charge of the first and the third focus-pixel forming a first couple, and for accumulating the charge of the second and the fourth focus-pixel forming a second couple, and for providing the accumulated charge in a second mode of operation;
the additional circuitry comprising at least one transistor located under the light shields of the focus-pixels.

4. The image sensor according to claim 3, wherein the first, second, third and fourth focus-pixel comprises a first, second, third and fourth photodiode respectively, and wherein the additional circuitry for accumulating the charge comprises a first transfer transistor for adding the charge from the first photodiode and the third photodiode, and a second transfer transistor for accumulating the charge from the second photodiode and the fourth photodiode.

5. The image sensor according claim 3, wherein the first couple comprises a first amplifier located under the light shields of the first and/or third focus-pixel, and wherein the second couple comprises a second amplifier located under the light shields of the second and/or fourth focus-pixel.

6. The image sensor according to claim 1, wherein the light shield of each focus pixel covers 40% to 60% of the pixel area, preferably about 50%.

7. A digital camera comprising an image sensor according to claim 1, and a lens for focusing incident light on the image sensor, and a control circuit adapted for reading the focus-related signals from the focus-pixels, and for controlling the relative position of the lens and the image sensor accordingly.

8. A method for reading focus information from an image sensor comprising a plurality of image pixels and a plurality of focus-pixels, the plurality of focus-pixels comprising at least a first and a second focus-pixel forming a first pair, and a third and a fourth focus-pixel forming a second pair, the pair of focus-pixels comprising a pair of corresponding light shields for partly shielding the focus-pixels from incident light so as to obtain focus-related information, each focus-pixel being adapted for storing an amount of charge dependent on the incident light, and for providing the focus-related signal in a first mode of operation; the image sensor further comprising circuitry for accumulating the charge of the first and the third focus-pixel forming a first couple, and for accumulating the charge of the second and the fourth focus-pixel forming a second couple, and for providing the accumulated charges as the focus related signals in a second mode of operation, the circuitry comprising active elements being located under the light shields of the focus-pixels, the method comprising the steps of:
1) in one step, obtaining focus information from the image sensor configured in the first mode, and
2) in another step, determining lighting information from the focus information, and if the lighting information is below a predefined threshold, reading focus information from the image sensor configured in the second mode; or, alternatively
3) in one step, obtaining focus information from the image sensor configured in the second mode, and
4) in another step, determining lighting information from the focus information, and if the lighting information is above a predefined threshold, reading focus information from the image sensor configured in the first mode.

9. A method for focusing a movable lens of a digital camera comprising the lens and an image sensor according to any of the claims 1-6, the method comprising the steps:
reading focus information from the image sensor according to claim 8;
focusing the lens based on the focus information.

* * * * *